(12) United States Patent
Copeland (10) Patent No.: US 10,726,142 B2
(45) Date of Patent: Jul. 28, 2020

(54) OPERATING SYSTEM INDEPENDENT, SECURE DATA STORAGE SYSTEM

(71) Applicant: ViiRii, LLC, Marietta, GA (US)

(72) Inventor: Scott R. Copeland, Pasadena, TX (US)

( * ) Notice: Subject to any disclaimer, the term of this patent is extended or adjusted under 35 U.S.C. 154(b) by 0 days.

(21) Appl. No.: 15/569,435

(22) PCT Filed: Jul. 5, 2016

(86) PCT No.: PCT/US2016/041019
§ 371 (c)(1),
(2) Date: Oct. 26, 2017

(87) PCT Pub. No.: WO2016/197155
PCT Pub. Date: Dec. 8, 2016

(65) Prior Publication Data
US 2018/0082075 A1 Mar. 22, 2018

Related U.S. Application Data

(60) Provisional application No. 62/170,116, filed on Jun. 2, 2015.

(51) Int. Cl.
*H04L 29/06* (2006.01)
*G06F 21/62* (2013.01)
(Continued)

(52) U.S. Cl.
CPC .......... *G06F 21/6218* (2013.01); *G06F 12/14* (2013.01); *G06F 12/1425* (2013.01); *G06F 21/85* (2013.01); *H04L 63/10* (2013.01); *H04L 63/20* (2013.01); *G06F 9/30* (2013.01); *G06F 2221/2127* (2013.01)

(58) Field of Classification Search
CPC .................................................. G06F 21/6218
See application file for complete search history.

(56) References Cited

U.S. PATENT DOCUMENTS 8,966,280 B2    2/2015  Aono
8,966,624 B2 *  2/2015  Sallam .................. G06F 21/564
                                                        726/22
(Continued)

FOREIGN PATENT DOCUMENTS

WO    WO-2009148374 A1 * 12/2009 ............. G06F 21/57

*Primary Examiner* — Shawnchoy Rahman
(74) *Attorney, Agent, or Firm* — Sheman D. Pernia (57) ABSTRACT

An intermediary data handler is used in a Secured Data Storage Subsystem (SDSS), to provide a host electrical computer system with security of certain data stored in memory of the computer system's static data storage device. The intermediary data handler is functionally disposed between the operating system (OS) and data storage device of the host computer. The data handler has Processor, Memory, and User Interface circuits, and resident software adapted to generate mocked-up response data in reply to an unauthorized read/write communication from the OS, the mock data response being automatically formatted to have a content and data-structure format acceptable by the host OS, while isolating and controlling the original communication from the OS. The SDSS includes host software adapted to integrate operation and function of the intermediary data handler with the host computer system to accomplish the security of data stored on the storage device.

3 Claims, 12 Drawing Sheets

(51) Int. Cl.
*G06F 21/85* (2013.01)
*G06F 12/14* (2006.01)
*G06F 9/30* (2018.01)

(56) References Cited

U.S. PATENT DOCUMENTS

| | | |
|---|---|---|
| 8,972,745 B2 | 3/2015 | Jordan et al. |
| 2012/0102571 A1* | 4/2012 | Sheldon .............. G06F 21/6218 726/26 |
| 2014/0150060 A1 | 5/2014 | Riley |
| 2014/0310800 A1* | 10/2014 | Kabra ..................... G06F 21/44 726/17 |
| 2015/0058970 A1 | 2/2015 | Raskin et al. |

* cited by examiner

OPERATING SYSTEM INDEPENDENT, SECURE DATA STORAGE SYSTEM

CONTINUITY DATA

This application claims the benefit of prior-filed application Ser. No. 62/170,116 filed 2 Jun. 2015, the content of which is incorporated herein by reference.

FIELD OF THE INVENTION

The present invention is in the field of electrical computer or digital data processing system processes and apparatuses for selecting and accessing data storage (Class 711). Specifically, the present invention comprises systems, methods, and apparatus for preventing file data alteration not consistent with defined security policy (subclass 26). More specifically, the subject matter of the present invention comprises means to prevent data/file tampering by limiting write access to authorized entities or processes (subclass 27).

SUMMARY OF THE INVENTION

The present Secured Data Storage Subsystem (SDSS) is independent of the operating system (OS) of the electrical computer/data processing system in which it is being used. The SDSS includes an intermediary data handler device that is functionally disposed between the OS and the memory of the main data storage device of an electrical computer or data processing system. The purpose of the intermediary data handler is to protect certain data (e.g., registry files) on the storage device from modification (e.g., by malware or unauthorized access). In the embodiments illustrated herein, the SDSS subsystem takes an incoming modify/write request from the operating system, and processes the request (and any associated data), not according to the operating system's instructions, but according to its own file system and rule set instructions—without writing to or modifying the target file on the storage device. The SDSS then "represents" to the OS that it has complied with the request and replies with an appropriate mocked-up data response. That is, the outgoing data the mock response has the content and structural format that is expected by the OS in a reply from the storage device. The SDSS technology purposefully misreports the result of the modify/write request targeting protected data and files, while maintaining autonomous control over the protected data and how it is handled. This provides the security and integrity of the protected data on a storage device, and has the advantage of being usable across platforms, without regard to the particular OS of the host electrical computer or data processing system.

Since the SDSS technology stores the protected data according to its own structure/rule set, and mimics in its replies to the OS whatever data structure the OS expects to see, the data stored on a storage device with the SDSS technology is readily accessible to any particular OS, without needing to change to the partition or format structure. The present SDSS can mimic the NTFS format while in a Microsoft Windows computer in one moment, and seconds later mimic the EXT4 format while being accessed by a Linux computer. The SDSS technologies intermediary data handler can mimic every format structure and partition scheme used by substantially all current operating systems. The present invention utilizes two distinct modes of operation. Normal mode allows the SDSS to handle read and write requests by an operating system to fulfill normal daily operations. The Administrative mode allows the SDSS to provide options to a User (i.e., an system administrator) form outside of the computer and the operating system. A User can utilize a mobile computing device and its WiFi/Bluetooth capability to speak directly with the SDSS hardware and utilize administrative functions independent of the storage devices or operating systems control. This system leaves hackers with no ability to influence the handling of data on the storage device as they do not have access to the SDSS firmware and can only influence the operating system. Even if the operating system is compromised, the SDSS technology is independent and will not allow the operating system to corrupt protected data in the storage device memory.

REFERENCE NUMERALS

10—Intermediary Data Handler
15—Communications Layer (Intermediary Data Handler 10 & Generated Data 20)
20—Generated (outgoing) Data
25—Communications Layer (Intermediary Data Handler 10 & Admin Only Data 30)
30—Admin Only Data
40—Converted Data Structure
45—OS Specific Data Structure(s): e.g., a) Linux; b) Windows; c) OS X
50—Data Conversion by Intermediary Data Handler 10
100—Computing Device
110—Communications Layer, Read/Write requests between Computing Device 100 & Storage Device 200
120—User Device
130—User Communications App
140—Signal (Wireless)
150—USB Connection
160—Operating System(s): a) Linux; b) Windows; c) OS X
170—CPU
175—RAM
178—SDSS/Data Handler Software/Instruction Set
180—BIOS (Basic Input Output System)/ROM (Read Only Memory)
185—Wireless Communication Hardware
190—Administrator Device
195—Admin Software Application
200—Storage Device
210—Storage Device Memory
220—Communications Layer (Storage Device 200 & Intermediary Data Handler 10)
230—Communications Layer (Data Handler 10 & Storage Device Memory 210)
300—Received Write Request Process
305—Start: processing received Write Request
310—Process
320—Decision
330—Process
340—Process
350—Process
360—Process
370—End: processing received Write Request
400—Received Read Request Process
405—Start: processing received Read Request
410—Process
420—Process
430—Process
440—Process
450—End: processing received Read Request
500—Change OS Platform Emulation
500—Start: change OS emulation process 510—Decision
520—Decision
530—Process
540—Decision
550—End: change OS emulation process
800—Administrative Mode Process
805—Start: enter Administrative Mode
810—Decision
820—Decision
830—Process
840—Decision
850—Process
860—End: exit Administrative Mode

DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

Figure 1A:
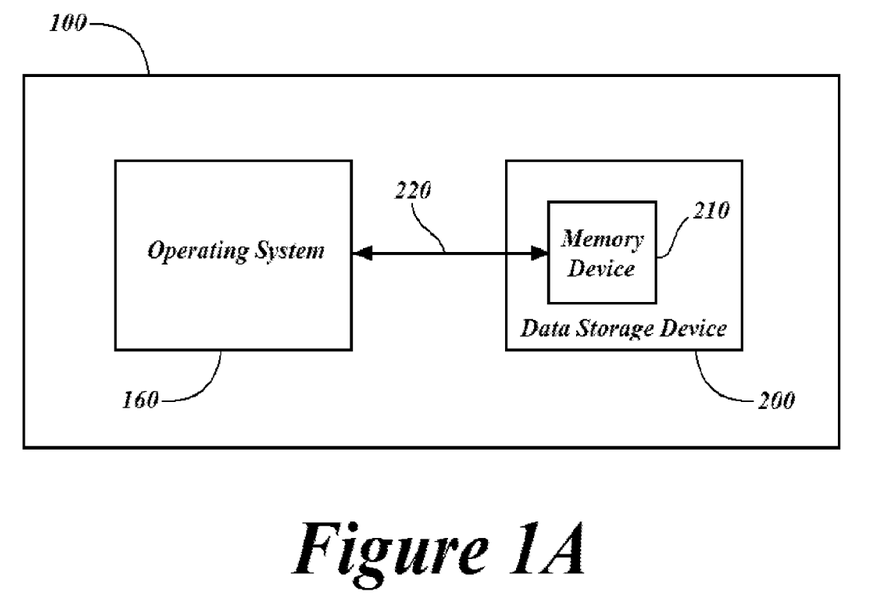
FIGS. 1A & 1B are schematic overviews: (A) of a typical prior art electrical computer system, and (B) of an electrical computer system including the present Secure Data Storage Subsystem.
Figure 1B:
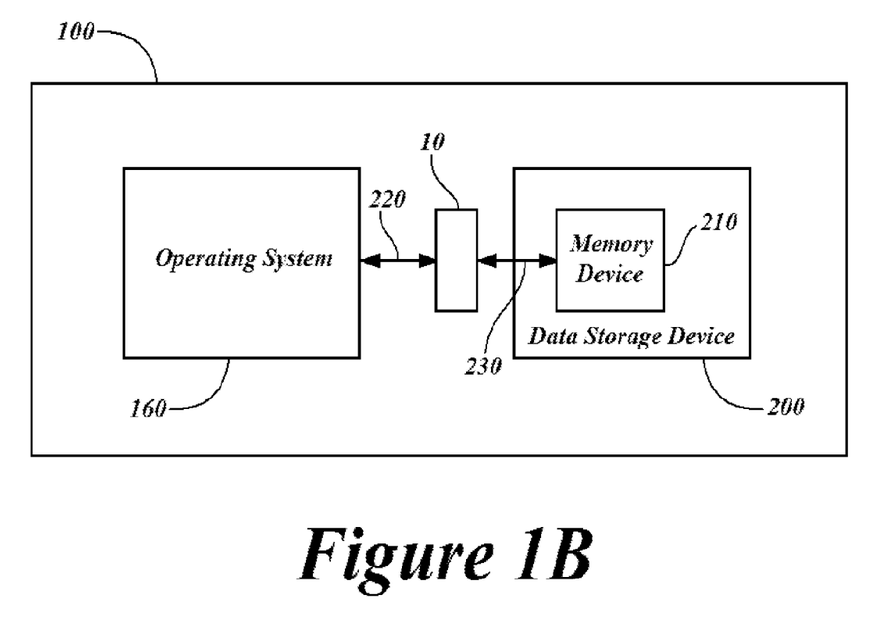

The heart of the present Secured Data Storage Subsystem (SDSS) is an Intermediary Data Handler 10. In the typical electrical computer system illustrated in FIG. 1A, read/write instructions are communicated by the Operating System ("OS") directly to the computer's memory storage device 200. The memory storage device in turn acts on the instructions and writes to or reads from the storage device memory 210, communicated a reply communication to the OS with the result of the read/write call. Thus, in the typical computer system, the memory storage device 200 operates on any read/write call from the OS. In contrast, as shown in FIG. 1B, a computer system enabled with the present invention, the OS does not directly communicate with the computer's memory storage device 200, but with the present Intermediary Data Handler 10. In like fashion, the computer's memory storage device 200 does not communicate directly with the OS, but only through the Intermediary Data Handler 10. In other words, in practicing the present invention, all read/write calls from the OS are first processed by the Intermediary Data Handler 10.

Functionally, the Intermediary Data Handler 10 sits between the Operating System 160 of a Computing Device 100 and the Storage Device Memory 210 of the Storage Device 200. See FIG. 1B. As the Computing Device 100 sends calls/requests to the Storage Device 200 via the communication Layer 110 they are intercepted by the Intermediary Data Handler 10 via the Layer 220. The Intermediary Data Handler 10 then, independent of the Operating System 160, converts the Data 40 into its own format and stores it via the Layer 230. The Intermediary Data Handler 10 applies its own rule set to how the Data 40 is stored, the format it is stored in and how it can be accessed and manipulated. The Intermediary Data Handler 10 will misreport the Data 40 structure to the Operating System 160 as to make the technology completely transparent to the Operating System 160 and the end User. By maintaining control of the Data 40 with hardware that acts independent of User and Operating System 160 instructions, the Intermediary Data Handler 10 can prevent malicious code from effecting meaningful changes to the Operating System 160 files while at the same time ensuring the integrity of User files. Hackers cannot compromise the SDSS/Intermediary Data Handler software 178, because Data Handler Software 178 acts independently of all other software on the computing device 100 with which it is associated.

Figure 2:
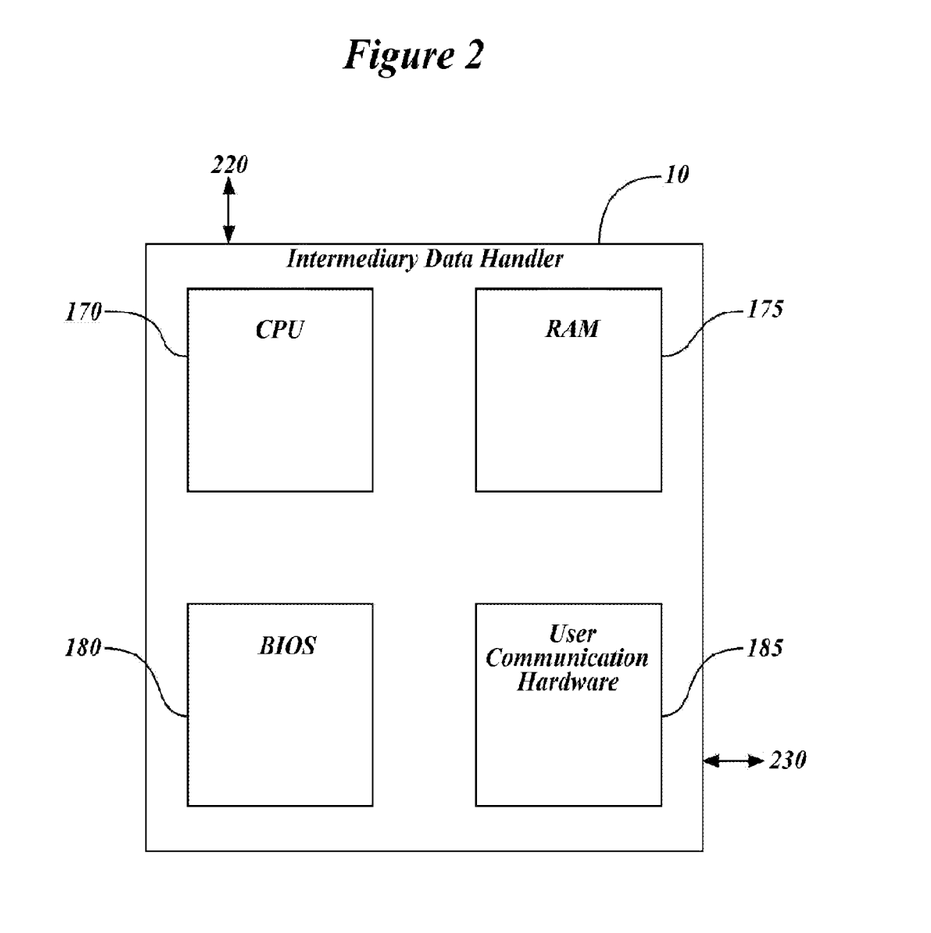
FIG. 2 illustrates hardware circuits useful in an Intermediary Data Handler.

The structure of the Intermediary Data Handler 10 should be sufficient that it can maintain absolute autonomy from all other components of the Computing Device 100 (see FIG. 2). The hardware inserted between Layer 220 and Layer 230 comprises Processor circuitry (e.g., a CPU) 170, Memory circuitry (e.g., RAM) 175, and in some embodiments: BIOS/ROM 180 circuitry and User Communication Hardware 185. The data handler 10 includes SDSS/Data Handler Software 178, which is adapted to enable the Data Handler 10 and its hardware/firmware components to carry out its functions.

Figure 3A:
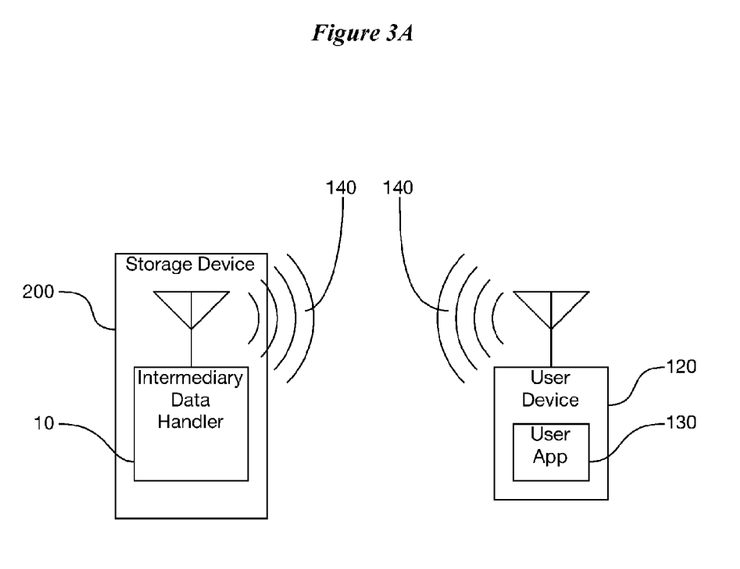
FIG. 3A shows a User Device communicating with the Intermediary Data Handler.
Figure 3B:
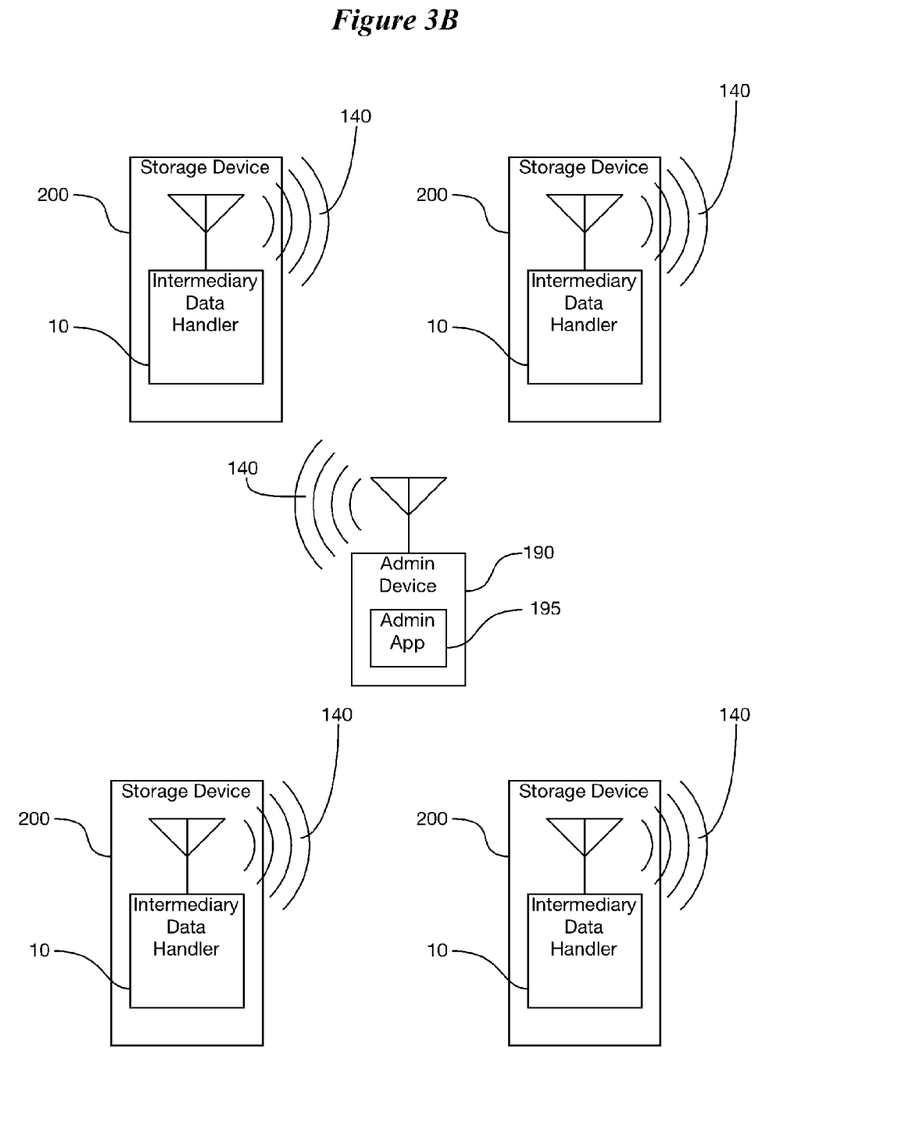
FIG. 3B shows an Admin Device using an Admin App to communicate with multiple Intermediary Data Handlers in an enterprise setting.
Figure 3C:
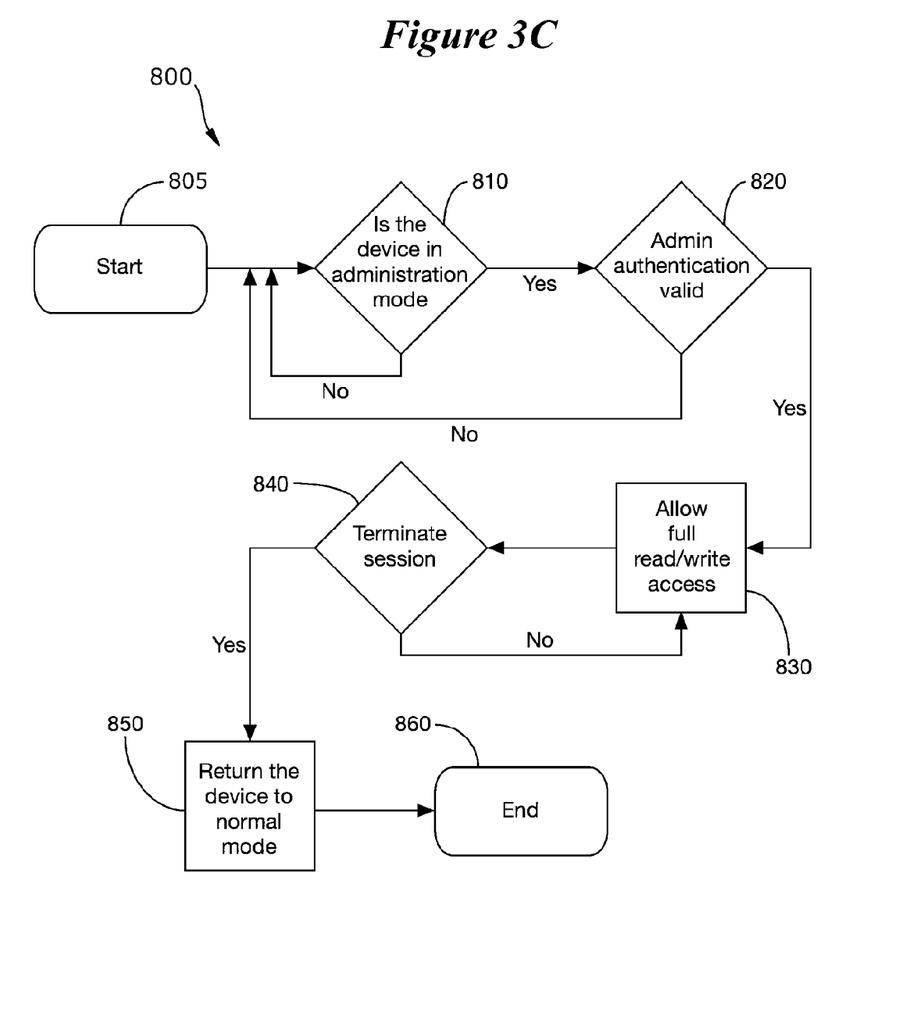
FIG. 3C a flow chart showing the process of a device switching the Intermediary Data Handler to an administrative mode.

The User Communication Hardware 185 of the Intermediary Data Handler 10 is used to communicate with a wireless User Device 120 or an Admin Device 190 (see FIG. 3A to 3C). A User Device 120 with a User App 130 or an Admin Device 190 with an Admin App 195 can be used to establish a Wireless communication session 140 with the Intermediary Data Handler 10, which is preferably onboard the Storage Device 200. The Wireless session 140 allows the User App 130 or the Admin App 195 to provide the end User with various options such as restoring data, switching to and from and administrative mode, maintenance options, emulation options, etc.

As shown in FIG. 3C, a User Device 120 or an Admin Device 190 can switching the Intermediary Data Handler 10 to an Administrative Mode 800. Switching into Administrative Mode 800 allows the Intermediary Data Handler 10 full read and write access to the Storage Device 200 with which it is associated. When initiating the Administrative Mode Start process 805, a decision 810 is made to detect whether the Intermediary Device Handler 10 is in an administrative mode. If "Yes," then a decision is made to determine if the User has valid authentication 820. If "Yes," then the SDSS allows full Read/Write Access 830. Upon Session Termination 840 the Intermediary Data Handler 10 device returns the SDSS to its normal/secure mode 850 and the Intermediary Data Handler 10 exits 860 the Administrative Mode 800.

Figure 4A:
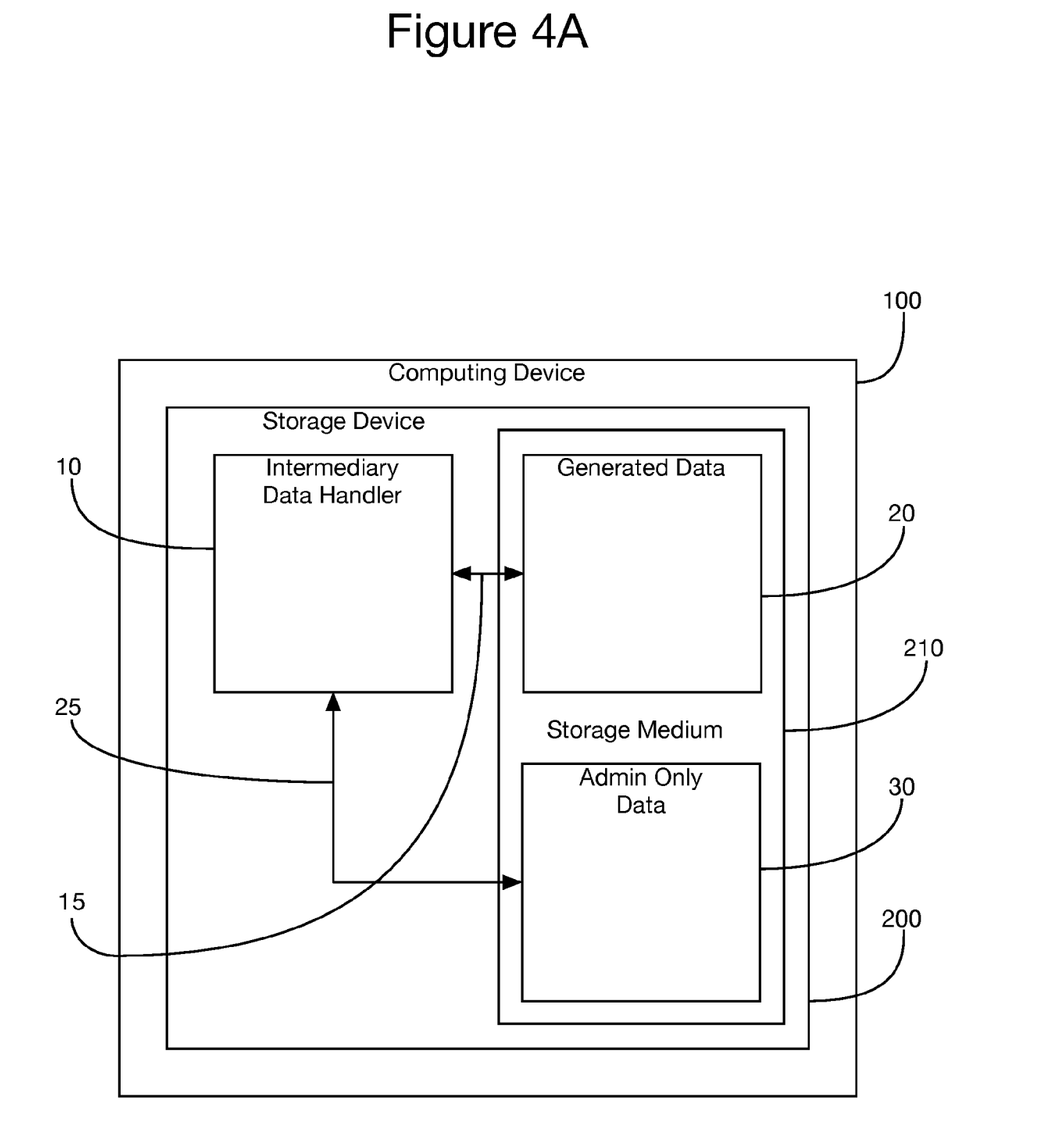
FIG. 4A shows the Intermediary Data Handler orchestrating data on an internal storage device.
Figure 4B:
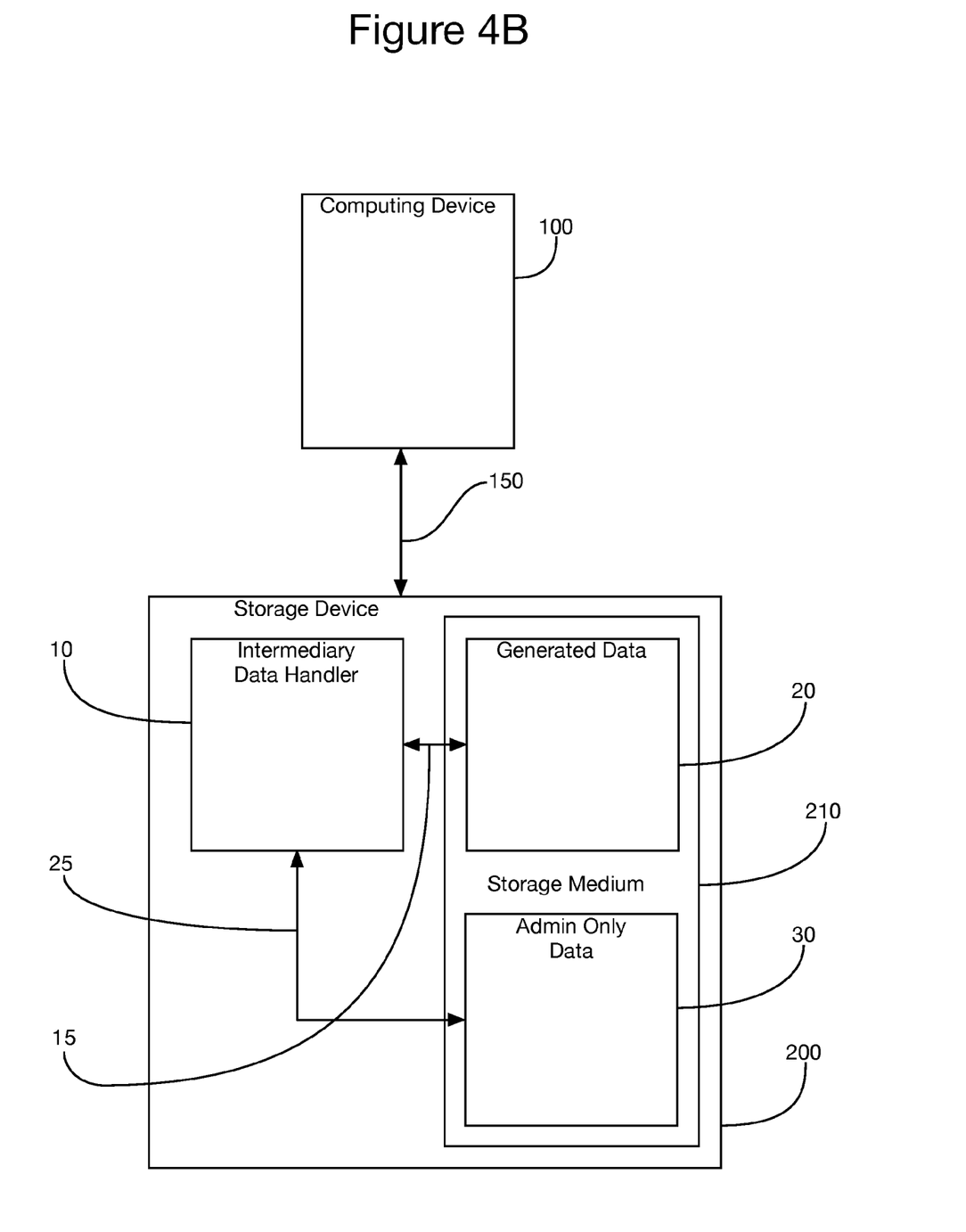
FIG. 4B shows the Intermediary Data Handler orchestrating data on an external storage device.

The Intermediary Data Handler 10 segregates the data sent to the Storage Device 100 into two separate file structures via Layer 15 and Layer 25 (see FIG. 4A). One structure is the Generated Data 20 structure, which is incoming data to be stored on the storage device memory 210. This is the structure where all data that is sent to the Storage Device 200 is directed by default. The other structure is the Admin Only Files 30. This is where important files, which should not be altered without the User's express instructions, are stored. Files in the Admin Only Files 30 section can only be altered if the User switches the Intermediary Data Handler 10 into administrative mode. If the Computing Device 100 sends an instruction to the storage device telling it to alter a file that resides in the Admin Only Files 30 section and the Intermediary Data Handler 10 is not in an administrative mode, then the instruction is disregarded, misreported, or redirected to the Generated Data 20 section. By employing this methodology the Intermediary Data Handler 10 can maintain the integrity of the Admin Only Files 30 data and prevent malicious instructions from committing any offense. The same can be accomplished by using an external storage device using a USB 150 connection (see FIG. 4B).

Figure 5:
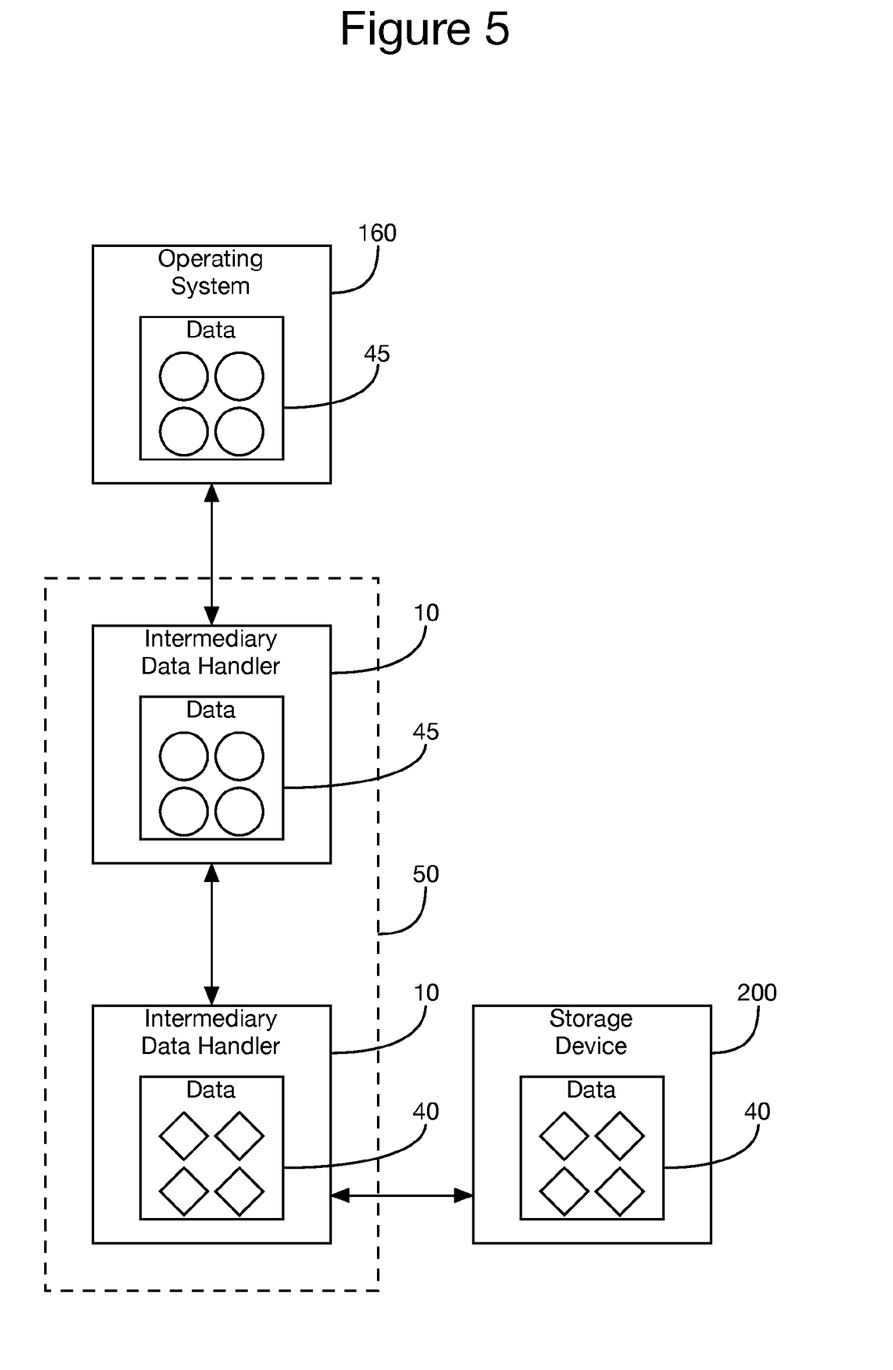
FIG. 5 shows the intermediary data handler converting the data from the operating system to the storage medium and vice versa.

The Intermediary Data Handler 10 uses the Data Conversion 50 to convert to and from its dual structured format to one contiguous format that is appropriate to the Operating System 160 it is working with (see FIG. 5). The Data 45 coming from the Operating System 160 passes through the Data Conversion 50 and is transformed into Data 40 before being stored. The same is true in reverse. Data 40 coming from the Storage Device 200 passes through the Data Conversion 50 implemented by the Intermediary Data Handler 10 and is made to mimic the appropriate Data 45 structure that is native to the Operating System 160.

Figure 6A:
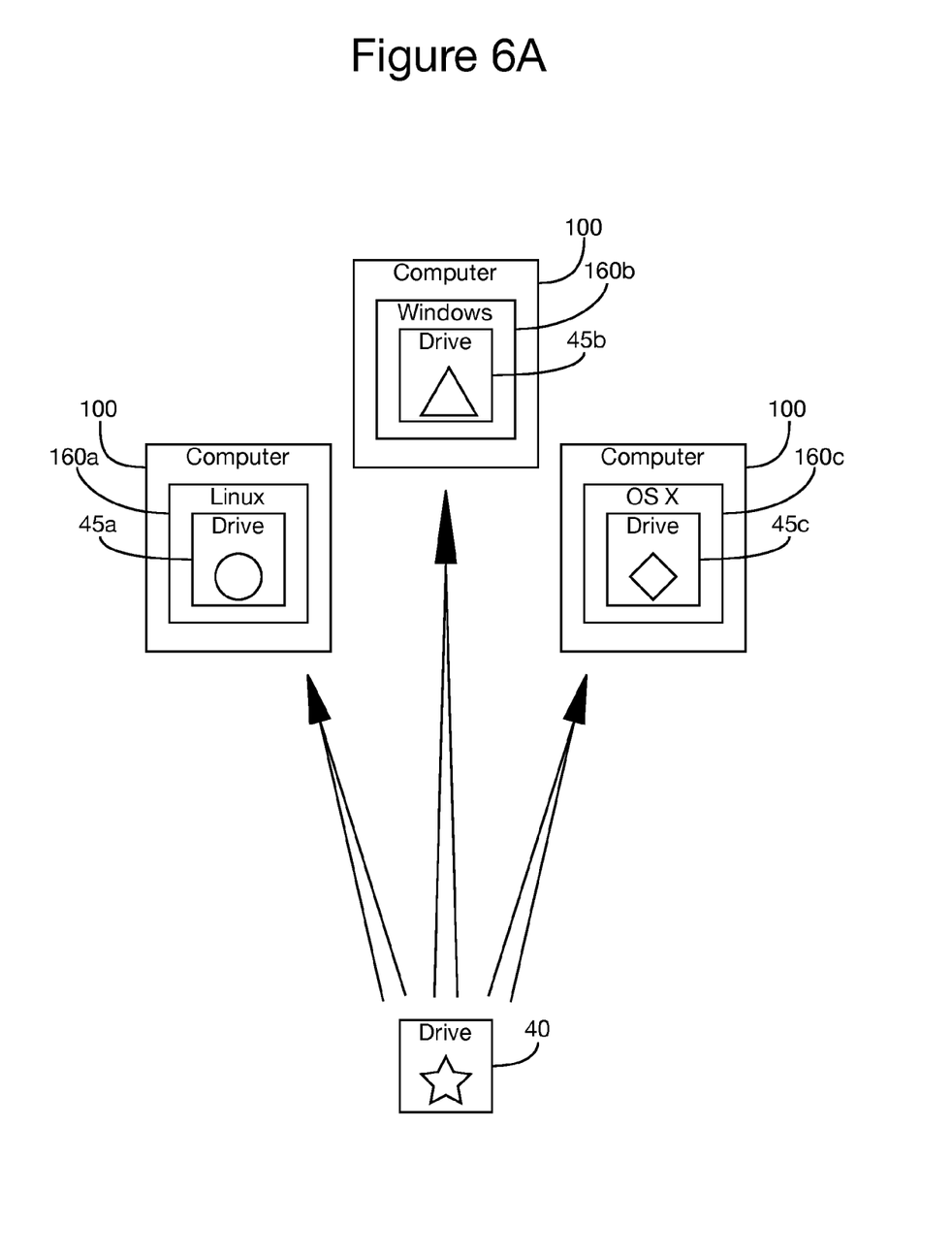
FIG. 6A shows how the Intermediary Data Handler misreports the actual data structure of the storage device to mimic the structure that the OS is expecting to see.
Figure 6B:
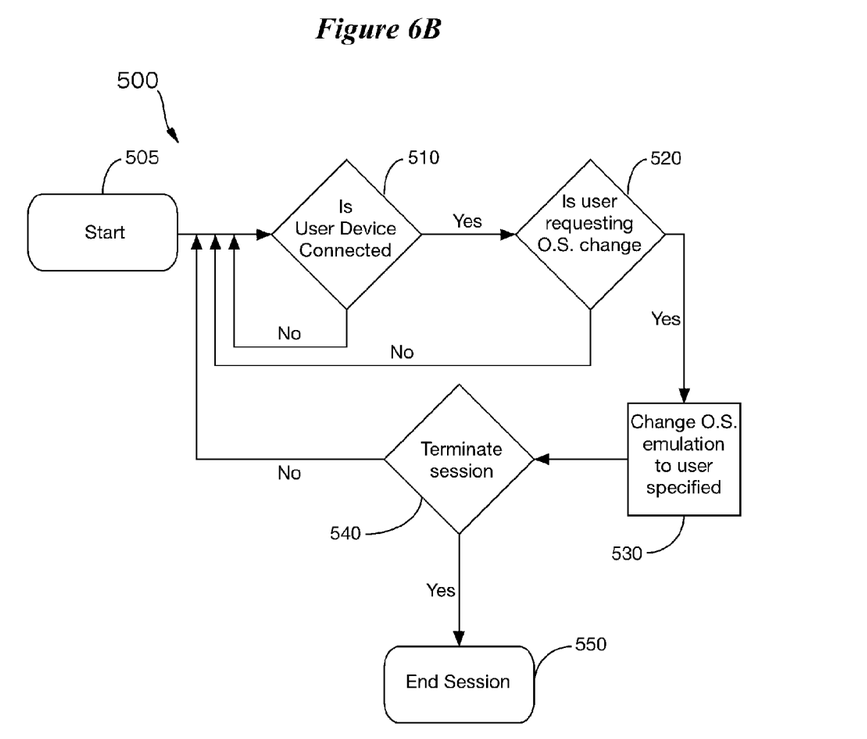
FIG. 6B a flow chart showing, from the perspective of the Intermediary Data Handler, how a User would change the operating system emulation.

Mimicking a file system allows the Data 40 on a Storage Device 200 to be acceptable to another system without making any actual partition or formatting changes and still be perceived as native by the host system (see FIGS. 6A and 6B). By being able to mimic an Operating System 160 Data 45 structure, the Storage Device 200 can be placed into a Computer 100 with Linux 160a, Windows 160b, OS X 160c, etc., and be accepted by the Operating System 160 as being a device with a native data structure such as 45a, 45b and 45c. This allows the Storage Device 200 to be move from one Computing Device 100 to another Computing Device 100 with a different Operating System 160 without having any compatibility issues.

FIG. 6B exemplifies the Change OS Emulation Process 500 for changing which OS 160 is being by the SDSS. The OS Emulation Selection Process 500 when started 505 first does a Connectivity Check 510 to determine whether a User Device 120 is connected to the Intermediary Data Handler 10. If "Yes," then the Selection Process 500 checks to see if the User Device 120 is requesting an operating system change 520. If "Yes", then the OS Emulation Selection Process 500 implements the requested emulation change 530. If Terminate Session 540 decision is subsequently made, then End Session 550 procedure is implemented.

Figure 7A:
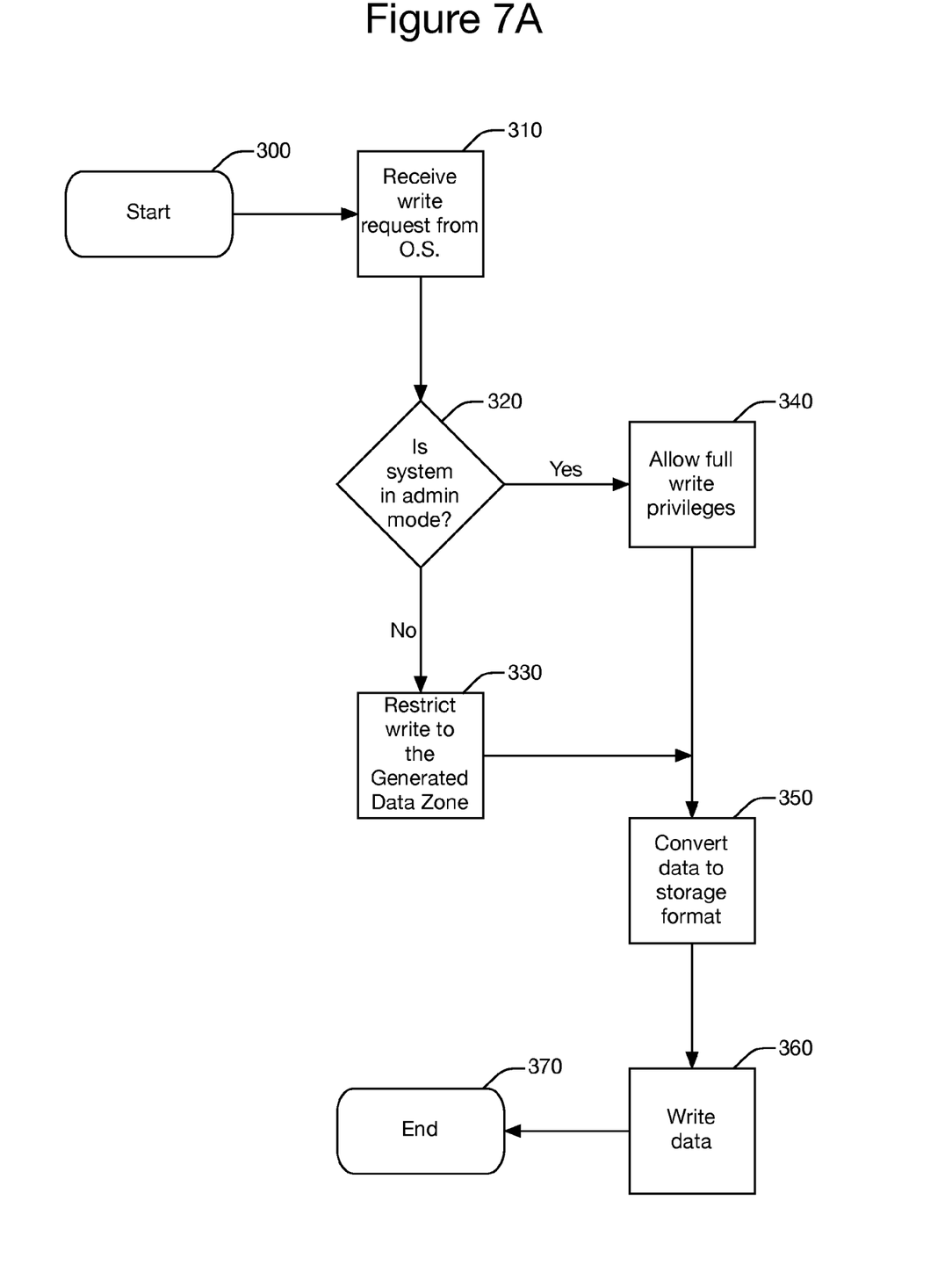
FIG. 7A a flow chart showing the operating sending a write request to the storage device.

The Intermediary Data Handler 10 facilitates requests from the Operating System 160 to write information to the Storage Device 200 following a simple base logic (see FIG. 7A). When the Received Write Request Process 300 is started 305 when the Intermediary Data Handler 10 receives a Write Request 310 from the operating system 160. The SDSS checks to see if the Intermediary Data Handler 10 is in Administration Mode 320. If the answer is "Yes," then the Intermediary Data Handler 10 will allow full write privileges 340. If the answer is "No," then the Intermediary Data Handler 10 will Restrict 330 the Write Request to the Generated Data 20 zone. The Intermediary Data Handler 10 will Convert Data 350 to appropriate Converted Data Structure 40. The Converted Data Structure 40 is then Written 360 to the Storage Device 200 and the Write Request Process 300 is Ended 370.

Figure 7B:
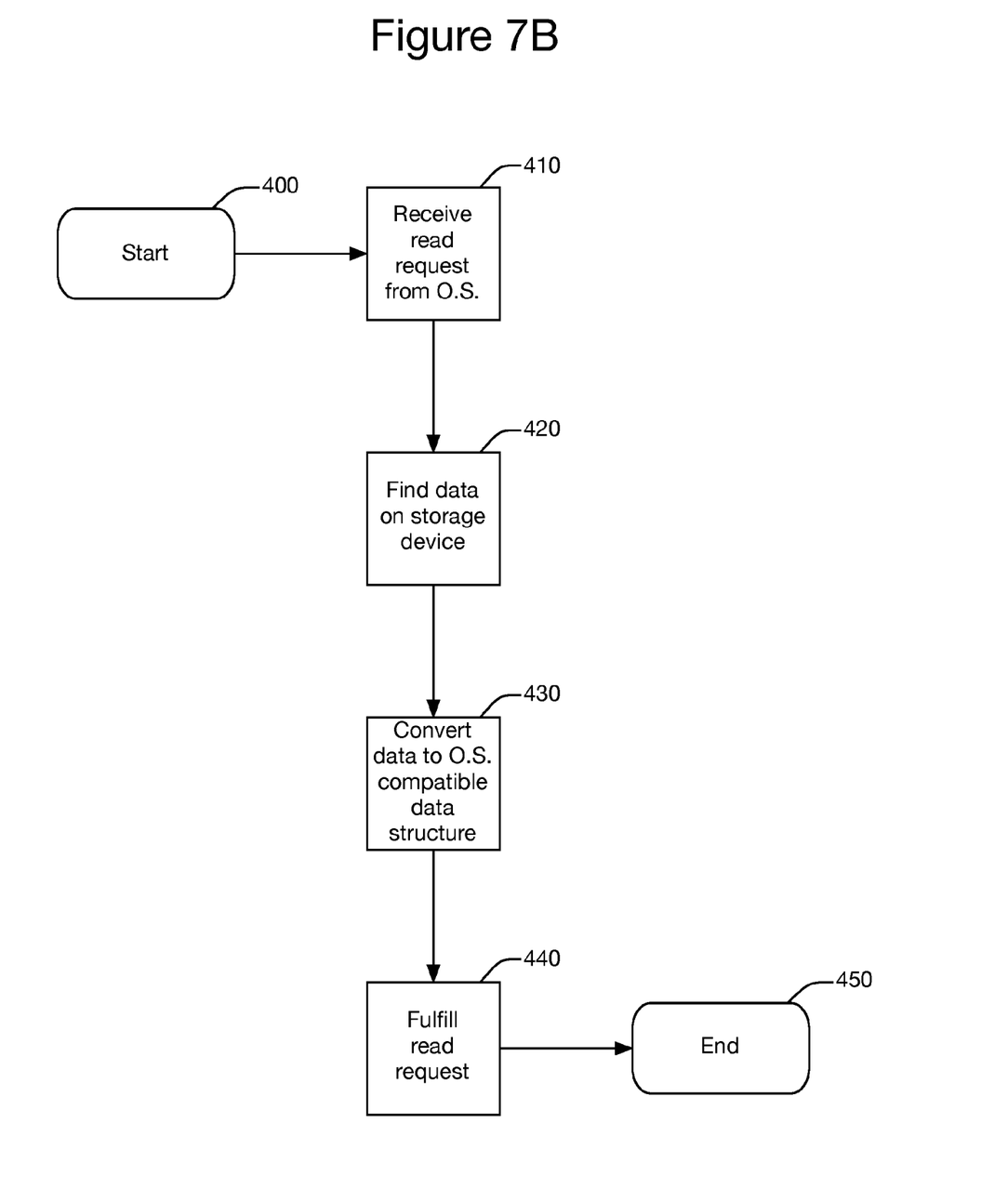
FIG. 7B a flow chart showing the operating sending a read request to the storage device.

Read Requests received from the OS 160 are processed following a similar logic: Received Read Request Process 400 (see FIG. 7B). The Read Request Process 400 is Started 405 when the Intermediary Data Handler 10 detects a Read Request 410 from the Operating System 160. The Intermediary Data Handler 10 then proceeds to Find Read Data 420 on the Storage Device 200. The Intermediary Data Handler 10 then Converts 430 the Found Data to the OS Specific Data Structure 45 compatible with the current Operating System 160 platform, and Fulfills the Read Request 440, after which the Received Read Request Process 400 is Ended 450.

While the above description contains many specifics, these should not be construed as limitations on the scope of the invention, but rather as exemplifications of one or another preferred embodiment thereof. Other variations are possible, which would be obvious to one skilled in the art. Accordingly, the scope of the invention should be determined by the scope of the appended claims and their equivalents, and not just by the embodiments.

What is claimed is:

1. An operating system (160) independent Secured Data Storage Subsystem (SDSS) for use with an electrical computer/digital data processing apparatus (100), the SDSS comprising:

a data storage device (200) of said electrical computer/digital data processing apparatus (100) in indirect communications with the operating system (160);

an intermediary data handler (10) has a local processing unit (170), a local buffer memory (175), a local data storage memory (180), and a User communication circuit (185), with the intermediary data handler (10) being functionally disposed in communications between the operating system (160) of said electrical computer/digital data processing apparatus (100) and a computer data memory (210) of the computer data storage device (200); and an SDSS/Data Handler Software/Instruction Set (178) is resident in the local data storage memory (180) and executable by the intermediary data handler (10), the SDSS/Data Handler Software/Instruction Set (178) enabling the Intermediary Data Handler (10) to function independent of the OS (160) of the computer/digital data processing apparatus (100) to intercept a Read/Write request from the OS (160) and to generate mock response data (20) to the Read/Write request, the mock response data (20) being in a data-structure format that is compatible with the OS (160), while separately preventing modification of data on the storage device (200) to ensure the integrity of data in the storage device memory (210) to provide said operating system (160) independent SDSS.

2. An operating system (160) independent Secured Data Storage System (SDSS) for use with an electrical computer/digital data processing apparatus (100) having a data storage device (200), the SDSS comprising:

an Intermediary Data Handler (10) device having Processor (170), Memory (175) and User Communication (185) circuitries, and the Intermediary Data Handler (10) functionally disposed in communications between the operating system (160) of said electrical computer/ digital data processing apparatus (100) and a storage memory (210) of the data storage device (200), an SDSS/Data Handler Software/Instruction Set (178), resident on and executable by the intermediary data handler (10), the data SDSS/Data Handler Software/ Instruction Set (178) adapted in response to a Read/ Write communication (110) from the operating system (100) to generate a mock response data reply, the mock response data reply having a content and data-structure format acceptable by the operating system (100), while isolating and maintaining control over the original Read/Write communication (110) from the operating system (100); and the SDSS/Data Handler Software/Instruction Set (178) further adapted to enable the SDSS (5) to accomplish the security of data stored in the storage memory (210) of the data storage device (200) to provide said operating system (160) independent SDSS.

3. An intermediary data handler (10) for use with a Secured Data Storage Subsystem (SDSS), the intermediary data handler (10) comprising:

a Processor circuit (170), a Memory circuit (175), and a User Interface circuit (185), the intermediary data handler (10) functionally disposed in communications between the operating system (160) of a host electrical computer/digital data processing apparatus (100) and a storage memory (210) of the data storage device (200); and a Data Handler Software/Instruction Set (178), resident on and executable by the Intermediary Data Handler (10), the Data Handler Software/Instruction Set (178) adapted to generate a mock response data reply in response to a Read/Write communication (110) from the operating system (160), the mock response data reply having a content and data-structure format acceptable by the operating system (100), while isolating and separately maintaining control over the original Read/Write communication (110) from the operating system (160), and further adapted to integrate operation and function of the intermediary data handler (10) with the host electrical computer/digital data processing apparatus (100) to accomplish the security of data stored in the storage memory (210) of the data storage device (200) to provide said intermediary data handler (10) for use with said operating system (160) independent SDSS.

* * * * *